(12) United States Patent
Galazin et al.

(10) Patent No.: US 10,029,527 B2
(45) Date of Patent: *Jul. 24, 2018

(54) TRAILING ARM SUSPENSION ASSEMBLY

(71) Applicant: SAF-HOLLAND, Inc., Holland, MI (US)

(72) Inventors: Gregory Galazin, Muskegon, MI (US); Edward Hammer, Muskegon, MI (US); William Broene, Lowell, MI (US); Greg Thorwall, West Olive, MI (US); Roger L. Jansen, III, Holton, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/083,981

(22) Filed: Mar. 29, 2016

(65) Prior Publication Data
US 2016/0250904 A1 Sep. 1, 2016

Related U.S. Application Data

(63) Continuation of application No. 14/294,853, filed on Jun. 3, 2014, now Pat. No. 9,352,627, which is a
(Continued)

(51) Int. Cl.
*B60G 9/00* (2006.01)
*B60G 7/02* (2006.01)
(Continued)

(52) U.S. Cl.
CPC .............. *B60G 9/006* (2013.01); *B60G 7/008* (2013.01); *B60G 7/02* (2013.01); *B60G 9/00* (2013.01);
(Continued)

(58) Field of Classification Search
CPC .......... B60G 7/008; B60G 9/00; B60G 11/28; B60G 2206/8201; B60G 2206/8207;
(Continued)

(56) References Cited

U.S. PATENT DOCUMENTS 7,048,288 B2 * 5/2006 Chan ...................... B60G 9/003
280/124.11
7,484,744 B2 * 2/2009 Galazin .................. B60G 9/003
280/124.116
(Continued)

FOREIGN PATENT DOCUMENTS

DE  202008014426  5/2009
EP  1728654  6/2006
(Continued)

*Primary Examiner* — Faye M Fleming
(74) *Attorney, Agent, or Firm* — Price Heneveld LLP

(57) ABSTRACT

A suspension assembly includes an axle member, a first trailing beam assembly and a second trailing beam assembly. The first trailing beam assembly and the second trailing beam assembly each include a first end operably coupled to a vehicle frame and a second end that includes a downwardly opening recess, wherein the recess includes an outer periphery, the axle member is positioned within the recess, and wherein a weld extends about a periphery of the recess, thereby securing the trailing beams to the axle member.

18 Claims, 15 Drawing Sheets

Related U.S. Application Data continuation of application No. 14/007,874, filed as application No. PCT/US2012/030715 on Mar. 27, 2012, now Pat. No. 8,910,961.

(60) Provisional application No. 61/468,359, filed on Mar. 28, 2011.

(51) Int. Cl.
*B60G 11/28* (2006.01)
*B60G 7/00* (2006.01)

(52) U.S. Cl.
CPC .............. *B60G 9/003* (2013.01); *B60G 11/28* (2013.01); *B60G 2200/31* (2013.01); *B60G 2202/152* (2013.01); *B60G 2204/126* (2013.01); *B60G 2204/4306* (2013.01); *B60G 2206/8201* (2013.01); *B60G 2206/8207* (2013.01)

(58) Field of Classification Search
CPC .......... B60G 2200/31; B60G 2204/126; B60G 2204/4306; B60G 9/003
See application file for complete search history.

(56) References Cited

U.S. PATENT DOCUMENTS

| | | |
|---|---|---|
| 8,910,961 B2 | 12/2014 | Galazin et al. |
| 9,352,627 B2 | 5/2016 | Galazin et al. |
| 2004/0051268 A1* | 3/2004 | Chan ...................... B60G 7/001 280/124.1 |
| 2004/0183271 A1 | 9/2004 | Galazin et al. |
| 2016/0250904 A1 | 9/2016 | Galazin et al. |

FOREIGN PATENT DOCUMENTS

| | | |
|---|---|---|
| EP | 2691249 | 2/2014 |
| EP | 2946952 | 11/2015 |
| WO | 2010095924 | 8/2010 |
| WO | 2012135200 | 10/2012 |

* cited by examiner

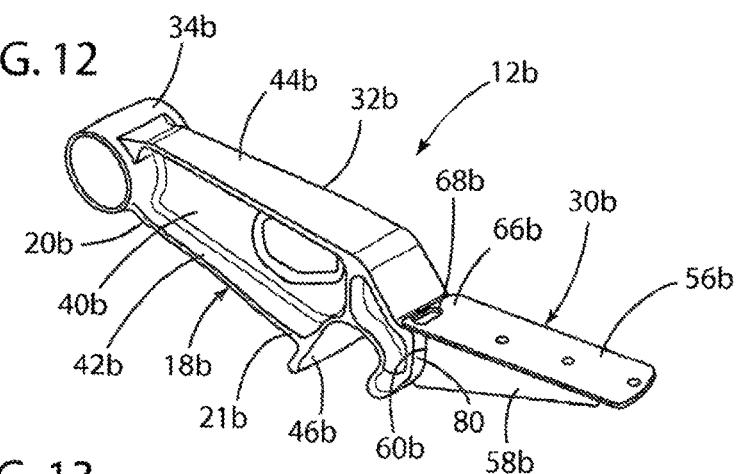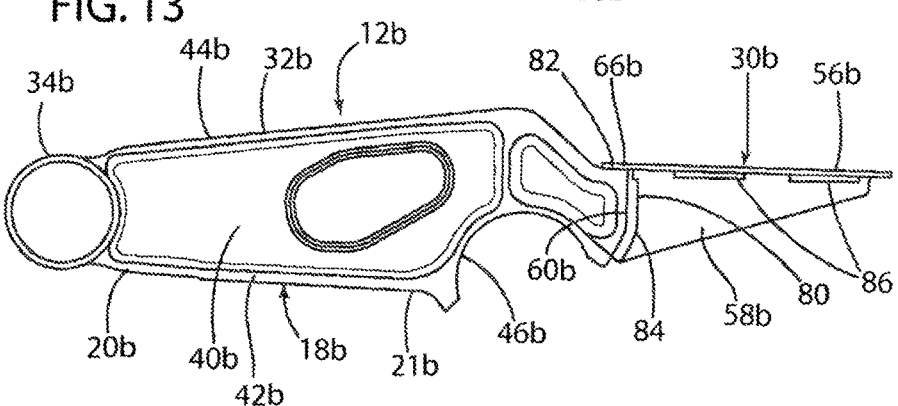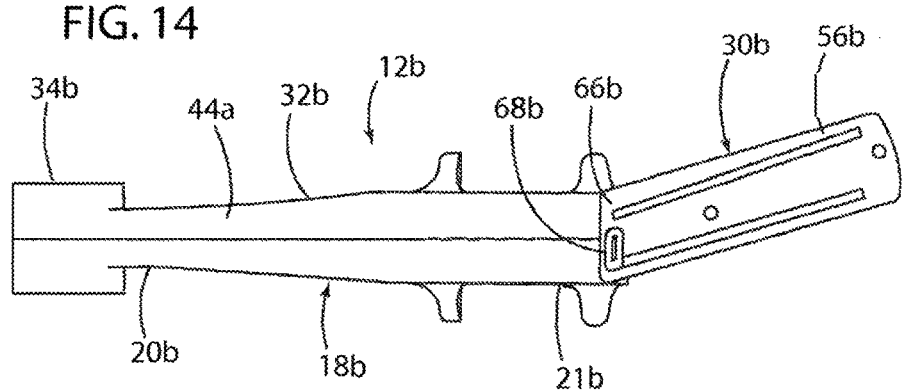

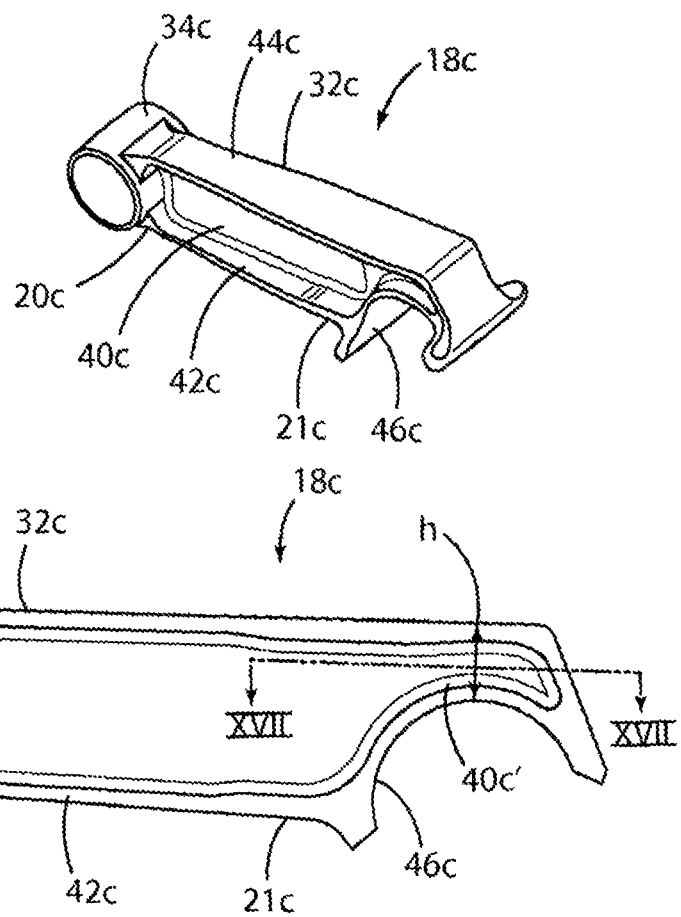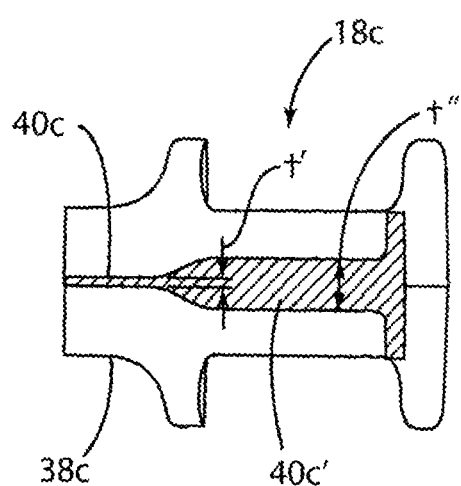

US 10,029,527 B2

TRAILING ARM SUSPENSION ASSEMBLY

BACKGROUND OF THE INVENTION

The present invention relates to an axle suspension system for heavy vehicles, and in particular to a trailing arm assembly with increased strength and which is adapted to increase the durability of an associated vehicle axle.

A variety of vehicle suspension systems utilizing air springs have been developed for use within semi-tractor trailer and other heavy duty vehicles. These systems control the relative position of the chassis with respect to an associated axle or axles and also to cushion the relative movement of the axle(s) toward the chassis frame. The suspension systems, and particularly the components such as the trailing arms and axle assemblies thereof, undergo significant stress during operation of the vehicle. Specifically, the connection between the trailing arms and the associated axle undergo significant stress when typical operational loads are exerted thereon, both in the vertical and lateral directions. While many systems have been developed to reduce such stress, previous approaches have been relatively expensive, and at times only marginally effective.

There is a need for a lightweight and inexpensive air spring suspension system that reduces the stress exerted between the trailing arms of the suspension system and the associated axle.

SUMMARY OF THE INVENTION

One aspect of the present invention includes a suspension assembly that includes an axle member, and a first trailing beam assembly and a second trailing beam assembly each including a trailing beam having a first end operably coupled to a vehicle frame and having a second end that includes an outwardly opening recess including an outer periphery, wherein the axle member is positioned within the recess, and wherein an uninterrupted weld extends between the axle member and the trailing beam and from a position substantially proximate a leading edge of the recess to a position substantially proximate a trailing edge of the recess, thereby securing the trailing beam to the axle member.

Another aspect of the present invention includes a suspension assembly that includes an axle member, and a first trailing beam assembly and a second trailing beam assembly each including a trailing beam having a first end operably coupled to a vehicle frame and having a second end that includes an outwardly opening recess, wherein the recess includes an outer periphery, the axle member is positioned within the recess, and wherein a weld extends between the axle member and the trailing beam and about the entire periphery of the recess, thereby securing the trailing beam to the axle member.

Yet another aspect of the present invention includes a suspension assembly that includes an axle member, and a first trailing beam assembly and a second trailing beam assembly each including a trailing beam having a first end operably coupled to a vehicle frame and having a second end that includes an outwardly opening recess, wherein the recess includes an outer periphery, a leading edge and a trailing edge, wherein the axle member is positioned within the recess and a weld extend between the axle member and the trailing beam and at least partially about the outer periphery of the recess, and wherein the weld comprises an uninterrupted weld that extends about a majority of the entire periphery of the recess.

BRIEF DESCRIPTION OF THE DRAWINGS

In the drawings:

FIG. 12 is a perspective view of a third embodiment of the trailing arm assembly;

FIG. 13 is a side elevational view of the third embodiment of the trailing arm assembly;

FIG. 14 is a top plan view of the third embodiment of the trailing arm assembly;

FIG. 15 is a perspective view of a fourth embodiment of the trailing arm;

FIG. 16 is a side elevational view of the fourth embodiment of the trailing arm;

FIG. 17 is a partial cross-sectional top view of the fourth embodiment of the trailing arm taken along the line XVII-XVII, FIG. 16; and, FIG. 18 is a top plan view of a plurality of a fourth embodiment of the trailing arm positioned within a rectangular casting core box.

DETAILED DESCRIPTION OF PREFERRED EMBODIMENTS

Figure 1:
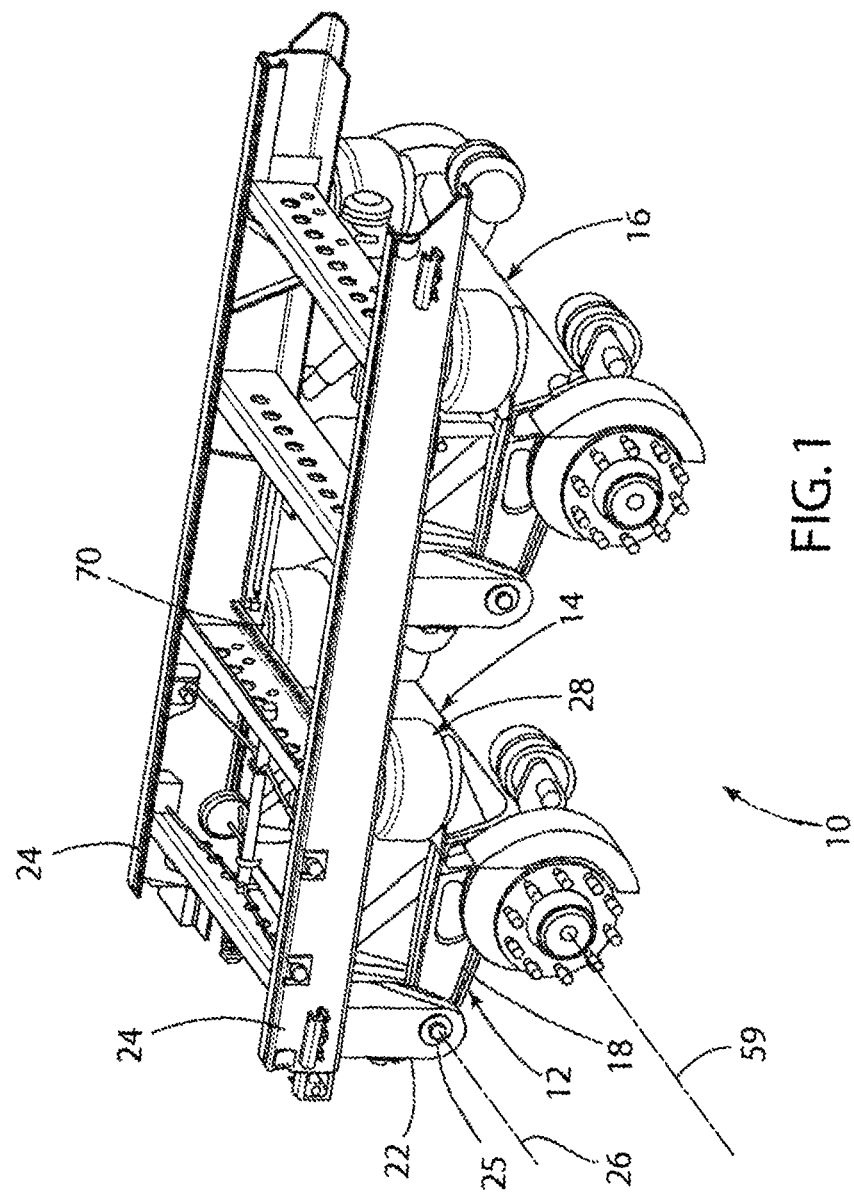
FIG. 1 is a perspective view of a suspension system that includes a trailing arm assembly embodying the present invention.
Figure 2:
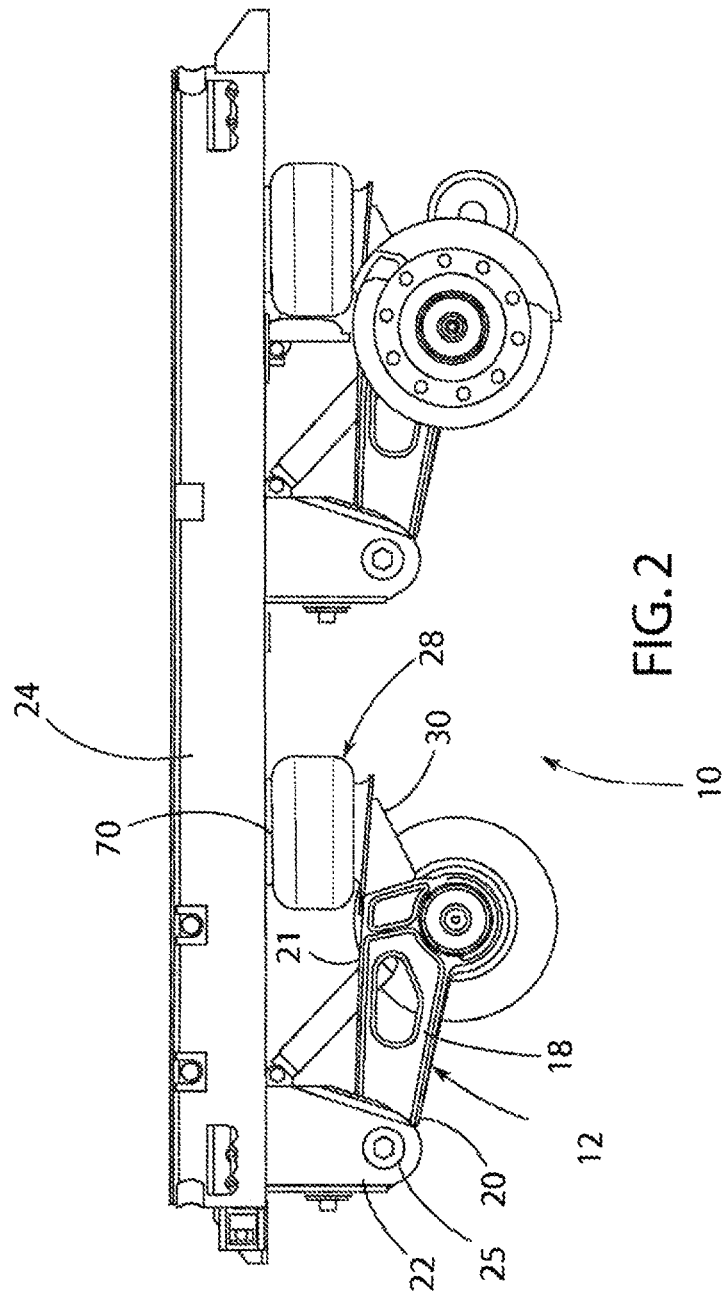
FIG. 2 is a side elevational view of the suspension system, wherein a braking assembly has been removed to better illustrate the trailing arm assembly.
Figure 3:
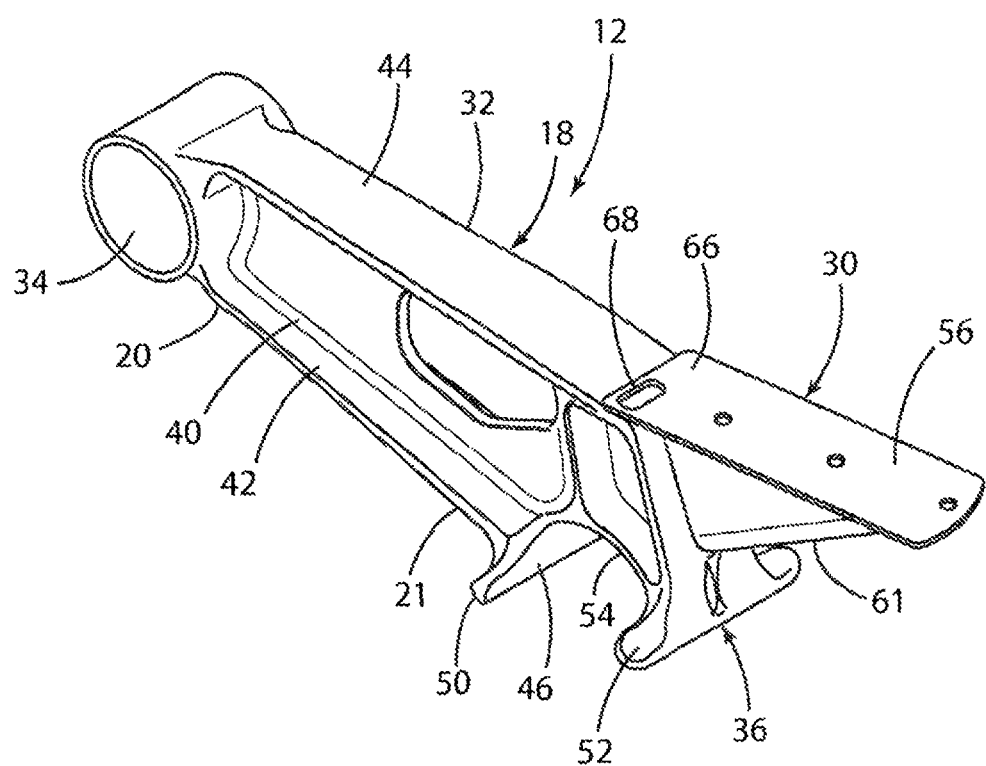
FIG. 3 is a perspective view of a first embodiment of the trailing arm assembly.
Figure 4:
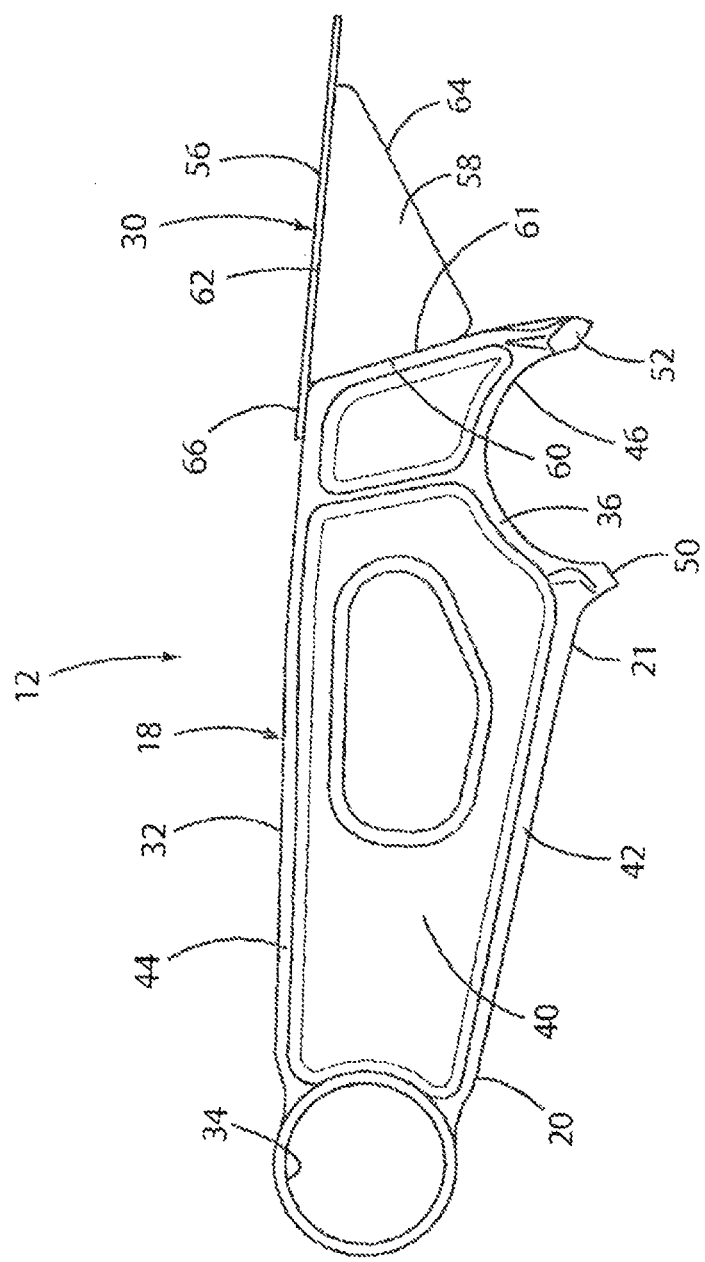
FIG. 4 is a side elevational view of the first embodiment of the trailing arm assembly.
Figure 5:
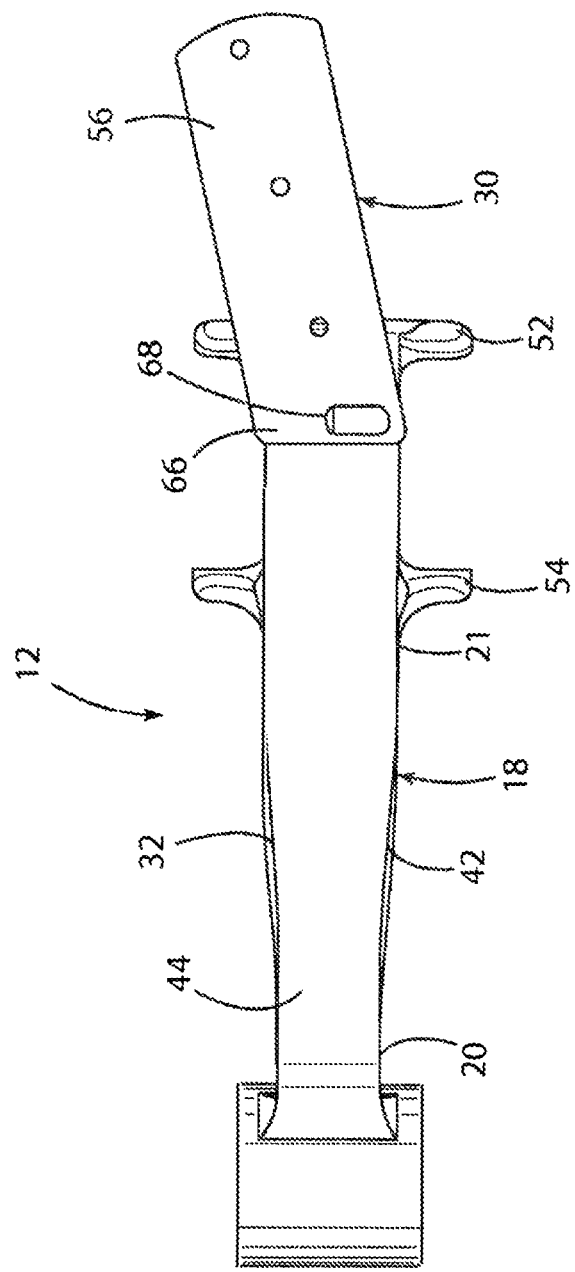
FIG. 5 is a top plan view of the first embodiment of the trailing arm assembly.
Figure 6:
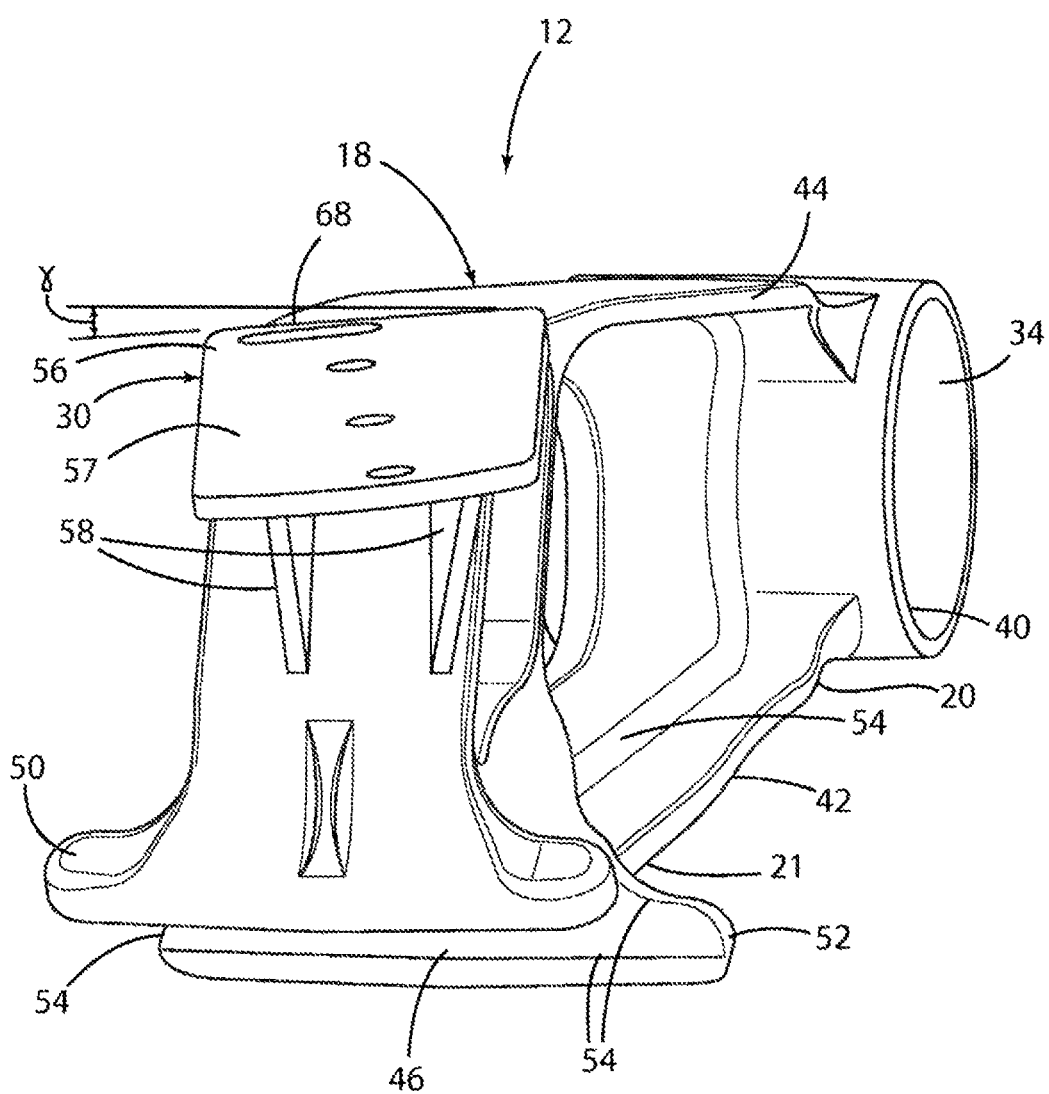
FIG. 6 is a perspective view of an end of the first embodiment of the trailing arm assembly.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 1 and 2) generally designates a heavy duty vehicle suspension system that includes a plurality of trailing arm assemblies 12 each embodying the present invention. In the illustrated example, the vehicle suspension system 10 includes a pair of tandem axle assemblies including a forward axle assembly 14 and a rearward axle assembly 16, respectively. Each of the axle assemblies 14, 16 is supported by an associated trailing arm assembly 12. Each trailing arm assembly 12 includes a trailing arm or beam 18 having a first end 20 and a second end 21. The first end 20 is pivotally supported by an associated hanger bracket 22 that is fixedly attached to and extends downwardly from a longitudinally extending vehicle frame member 24. Specifically, the first end 20 of the hanger bracket 22 is pivotally coupled to the associated hanger bracket 22 via a bushing assembly 25 to pivot about a pivot axis 26. An air spring assembly 28 is positioned between an air spring support 30 of the trailing arm assembly 12 and the vehicle frame member 24.

As best illustrated in FIGS. 3-6, each trailing arm assembly 12 includes the trailing arm 18 and the air spring support 30. The trailing arm 18 includes a body portion 32 having a bushing aperture 34 located at the first end 20, and an axle adapter 36 located at the second end 21. The body portion 32 comprises a metal alloy, is preferably integrally cast as a single piece, and includes an I-shaped cross-sectional configuration including a vertical web portion 40, a bottom flange 42, and an upper flange 44.

Figure 7A:
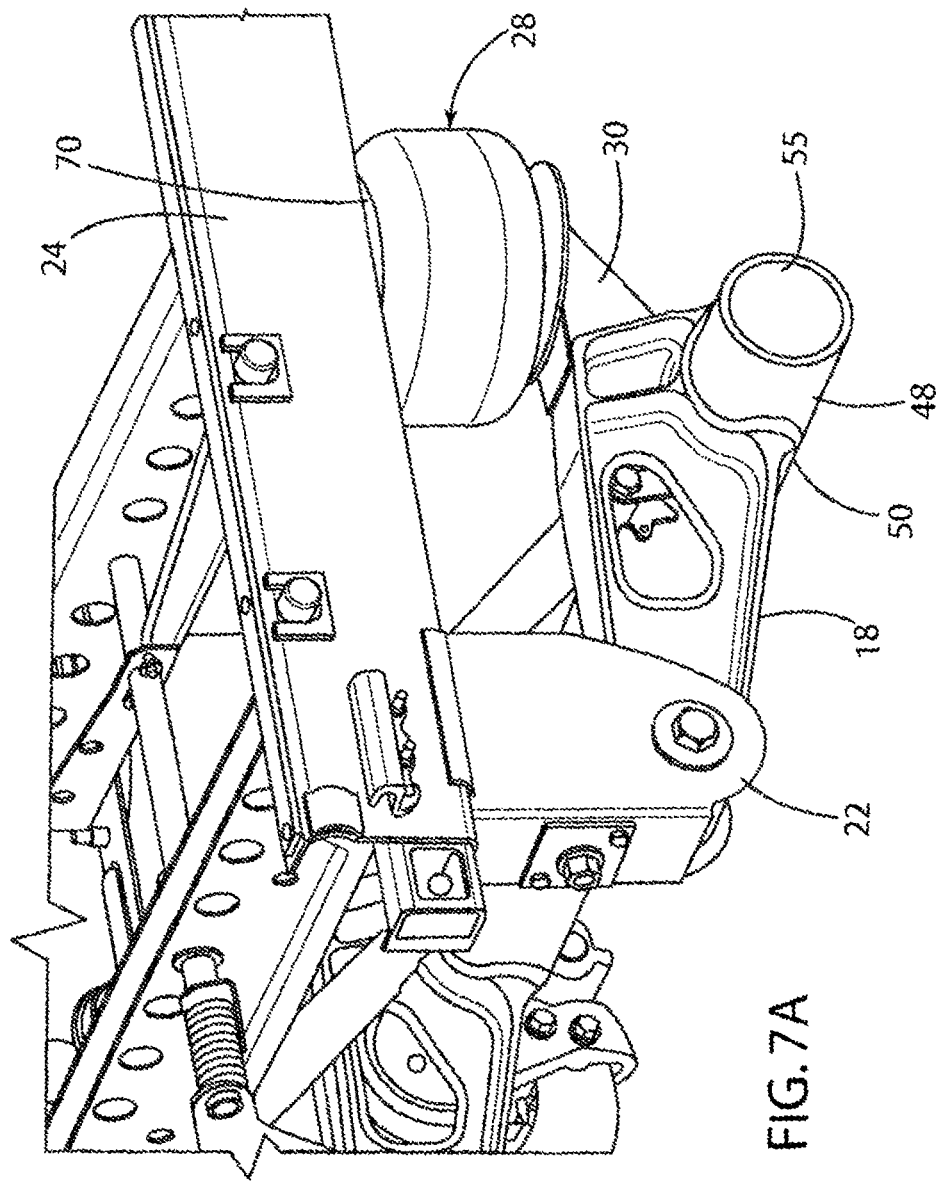
FIG. 7A is an enlarged, partial perspective view of the suspension system, and in particular the trailing arm assembly.
Figure 7B:
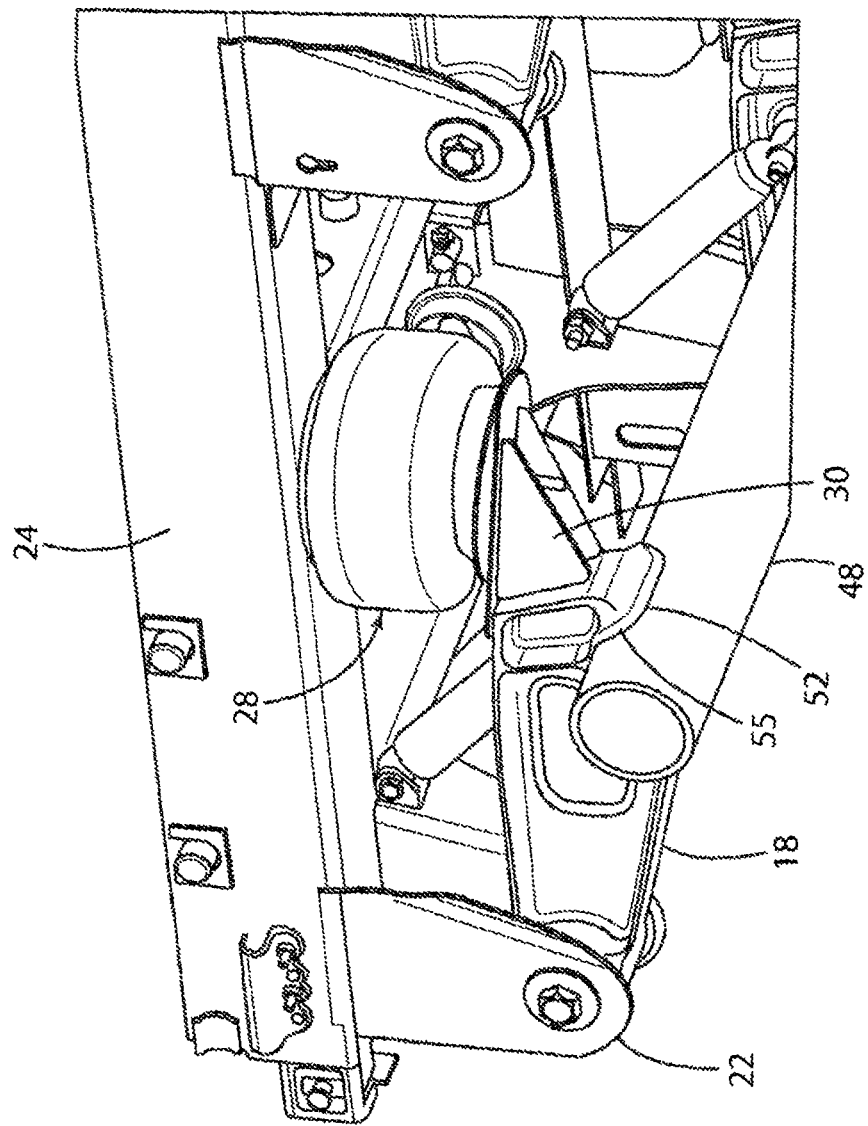
FIG. 7B is an enlarged, partial perspective view of the suspension system, and in particular the trailing arm assembly.
Figure 8:
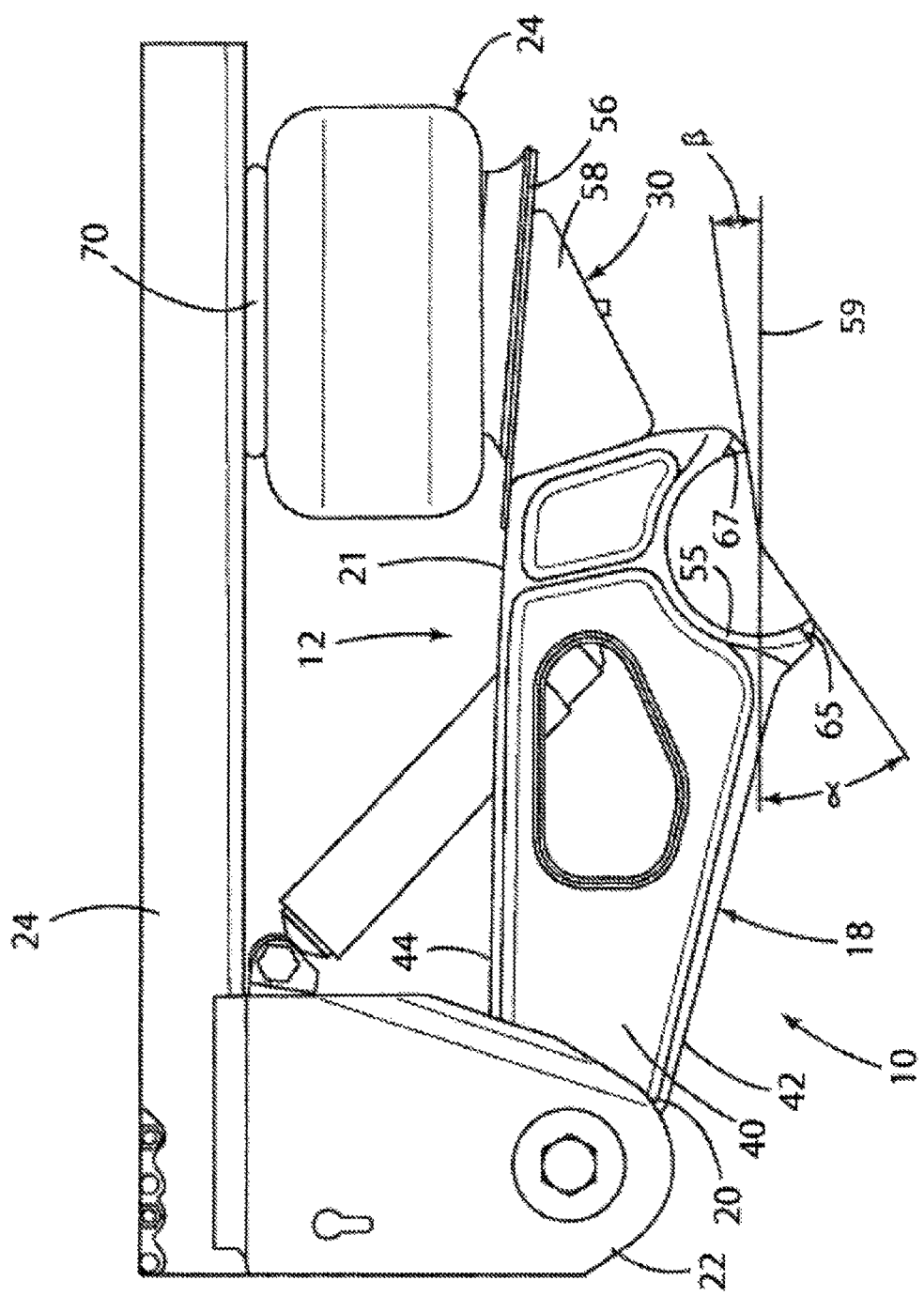
FIG. 8 is an enlarged side elevational view of the first embodiment of the trailing arm assembly.
Figure 9:
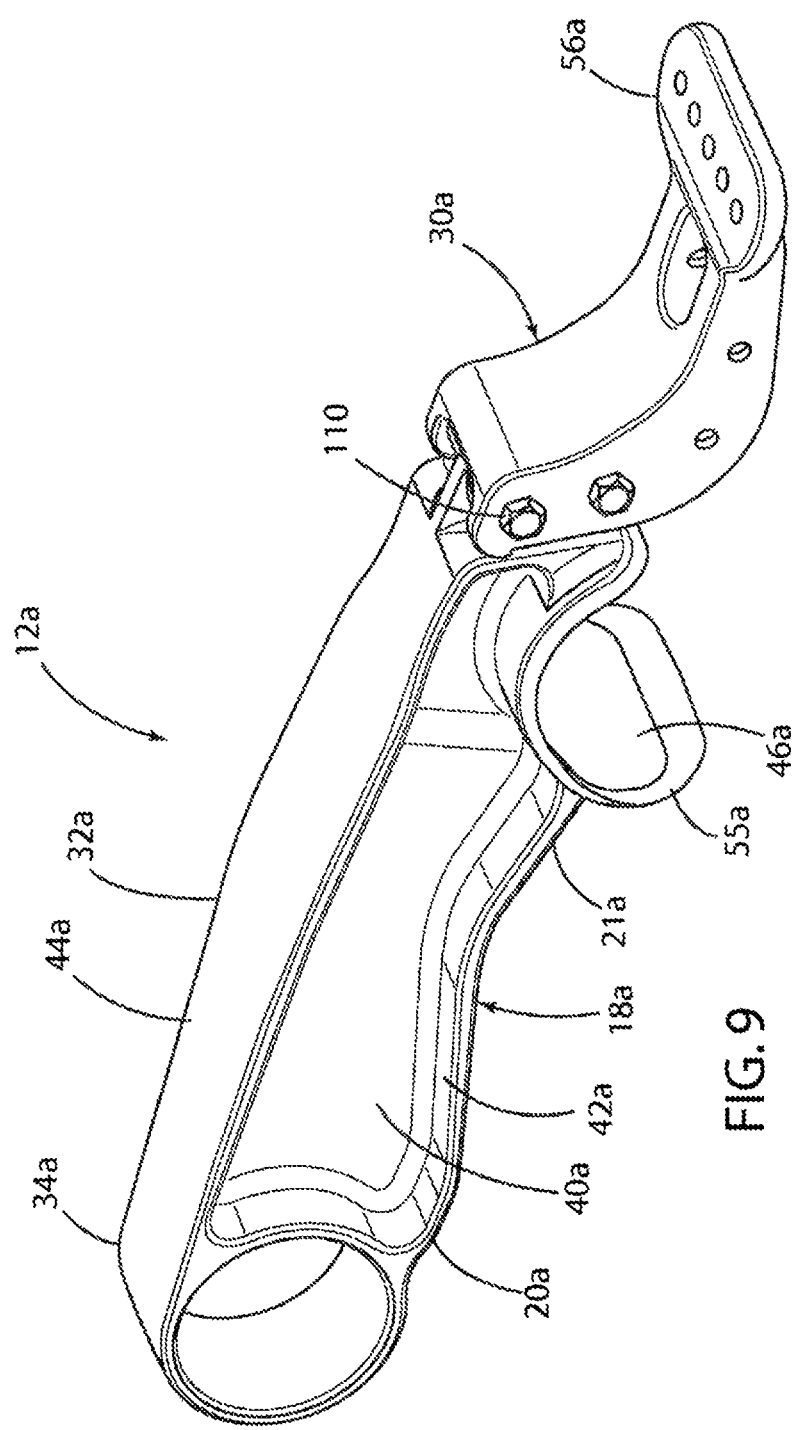
FIG. 9 is a perspective view of a second embodiment of the trailing arm beam assembly.
Figure 10:
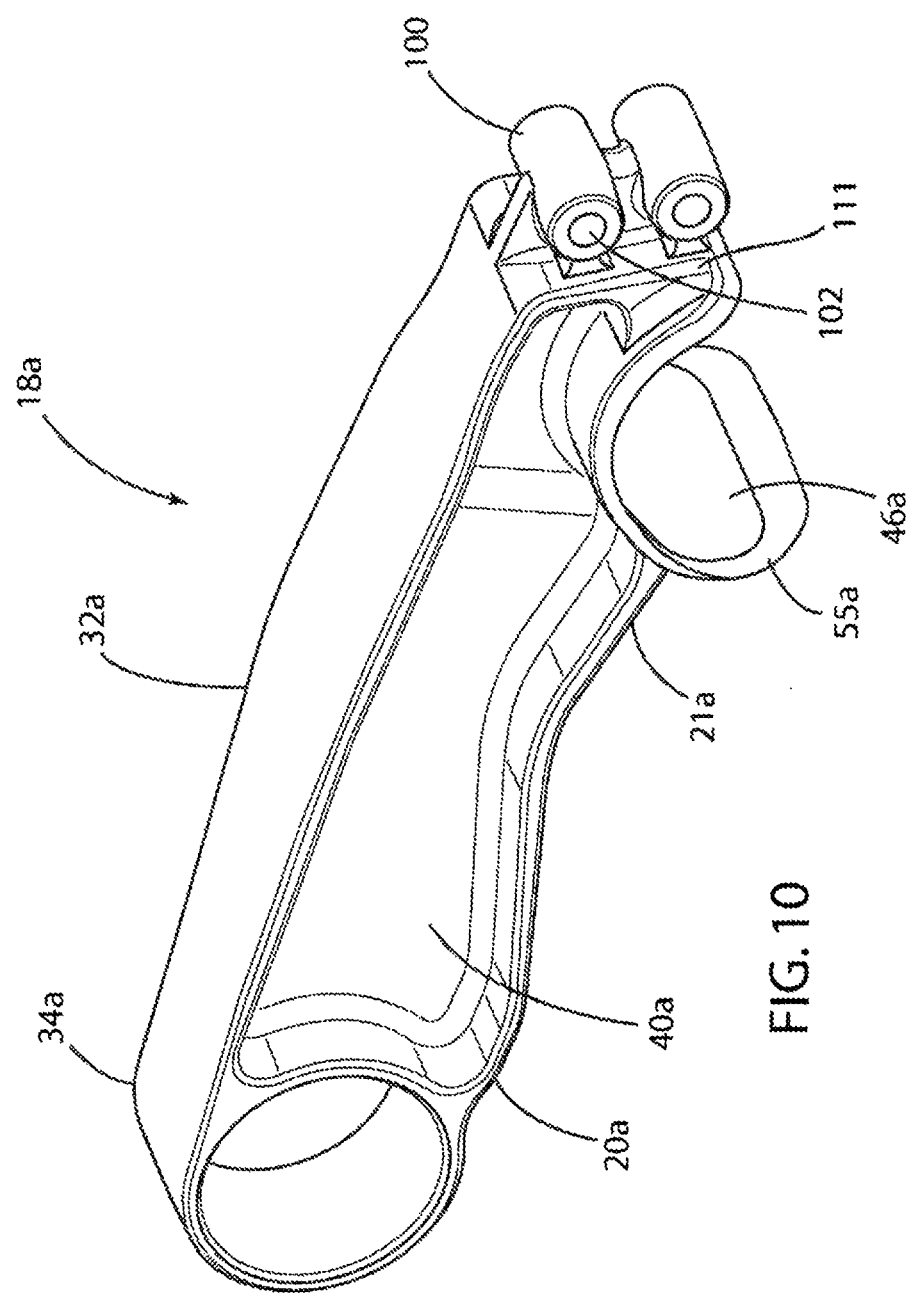
FIG. 10 is a perspective view of a trailing arm beam of the second embodiment of the trailing arm beam assembly.
Figure 11A:
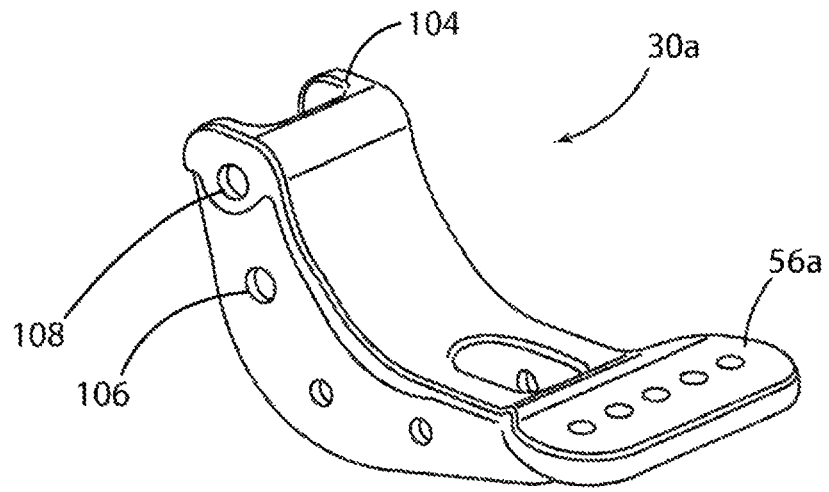
FIG. 11a is a rear perspective view of a spring support member of the second embodiment of the trailing arm beam assembly.
Figure 11B:
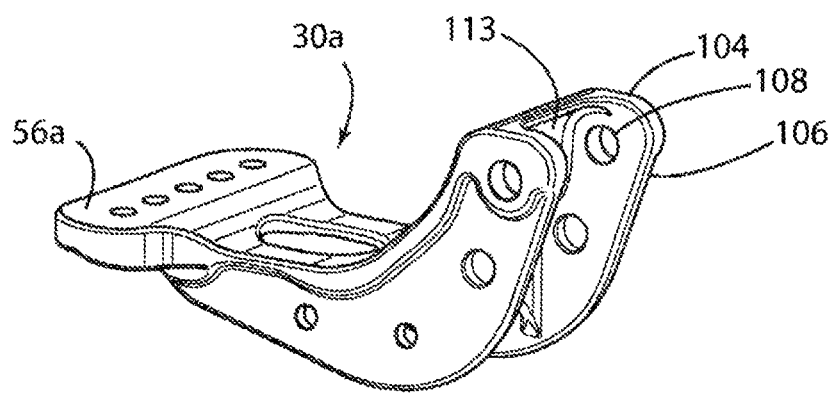
FIG. 11b is a front perspective view of the spring support member of the second embodiment of the trailing arm beam assembly.

The axle adapter 36 of the trailing arm 18 includes an outwardly, and specifically downwardly-opening, arcuately-shaped recess 46 that receives a vehicle axle 48 (FIGS. 7A, 7B) of the axle assembly 14, 16 therein. The axle adapter 36 further includes a pair of laterally extending forward weld ears 50 and a pair of laterally extending rearward weld ears 52. The recess 46 and the weld ears 50, 52 cooperate to define an axle seat periphery 54, about which the trailing arm 18 is welded to the associated axle 14, 16. In assembly, a single continuous weld 55 is preferably applied about the entire length of the axle seat periphery, thereby reducing the number of weld ends and increasing the durability of the axle connection. Specifically, welding about the entire axle seat periphery between the axle adapter 36 and the axle 48, reduces stress risers associated with using multiple welds, and allows a relatively thin axle wall to be utilized. As best illustrated in FIG. 8, the forward weld ears 50 and rearward weld ears 52 are positioned and configured with regards to the associated axle 14 such that the weld 55 positioned proximate a leading edge 65 of the forward weld ears 50 preferably forms a negative angle $\alpha$ with the horizontal 59 of between about 30° to about 45°, and more preferably of about 35°, and such that the weld 55 positioned proximate a trailing edge 67 of the rearward weld ears 52 preferably forms a positive angle $\beta$ the horizontal 59 of between about 25° and about 45°, and more preferably of about 8°, thereby reducing the stress exerted on the axle connection by typical operational loads. The location of the weld ears 50, 52, and thus the associated welds, significantly reduces the stress swing exerted on the weld ears 50, 52 and the welds 55.

The air spring support 30 (FIGS. 3-6) of the trailing arm assembly 12 includes a top plate or spring support plate 56 upon which the associated air spring assembly 28 is supported, and a pair of support brackets 58 extending between the second end 21 of the trailing arm 18 and the top plate 56. Specifically, each support bracket 58 is generally triangularly shaped and includes a forward edge 60 weldably secured to a rearward face 61 of the second end 21 of the trailing beam 18, a top edge 62 weldably secured to an underside of the top plate 56, and a downwardly facing edge 64. The top plate 56 is positioned with respect to the support brackets 58 such that a forward edge portion 66 of the top plate 56 overlies the upper flange 44 of the trailing arm 18. The forward edge portion 66 includes a welding window 68 which receives a weld, thereby securing the top plate 56 to the trailing arm assembly 12. It is noted that the weld window 68 is located on an outboard side of the top plate 56 such that the top plate 56 is welded to a draft surface of the trailing arm 18, thereby causing the top plate 56 to "tilt" to the outboard side of the trailing arm 18. Specifically, the spring supporting surface 57 of the top plate 56 is outwardly canted with regards to at least one of the central axis member 39 and the central axis of the pivot axis 26 at an angle $\infty$ of preferably within the range of between about 0.5° and about 3°; and more preferably within the range of between about 0.5° and 1.5°. As a result, loading of the overall suspension system 10 causes the overall trailing arm assembly 12 to "tilt" inboard such that the top plate or air spring mounting plate 56 is substantially parallel to upper air spring mounting plates 70 (FIG. 1) attached to the frame member 24. The resulting parallel relationship between the top plate 56 and the associated upper air spring mounting plate 70 reduces the wear exerted on the air spring assembly 28 during operation.

The reference numeral 12a (FIGS. 9-11b) generally designates another embodiment of the trailing arm assembly of the present invention. Since the trailing arm assembly 12a is similar to the previously described embodiment of the trailing arm assembly 12, similar parts appearing in FIGS. 1-8 and FIGS. 9-11b respectively are represented by the same, corresponding reference numeral, except for the suffix "a" in the numerals of the latter. In the illustrated example, the trailing arm assembly 12a includes the trailing arm 18a and the air spring support 30a. The second end 21a of the trailing arm includes a pair of rearwardly extending eyelets or hinge members 100 having bolt-receiving apertures 102 extending therethrough. The air spring support 20a is generally arcuately-shaped and includes a forwardly-extending coupling portion 104 and a rearwardly-located spring support plate 56a. The coupling portion 104 includes a pair of laterally-spaced plate portions 106 that flank the hinge members 100 and include apertures 108 that correspond to the apertures 102 and that receive bolts 110, thereby coupling the air spring support 20a with the trailing arm member 18a. The end surface 111 of the trailing arm 18a is machined and abuts a machined surface 113 of the air spring support 30a, so as to support downward forces exerted by the air spring 28 onto the air spring support 30a.

The reference numeral 12b (FIGS. 12-14) generally designates another embodiment of the trailing arm assembly of the present invention. Since the trailing arm assembly 12b is similar to the previously described embodiment of the trailing arm assembly 12, similar parts appearing in FIGS. 1-8 and FIGS. 12-14 respectively are represented by the same, corresponding reference numeral, except for the suffix "b" in the numerals of the latter. In the illustrated example, the trailing arm assembly 12b includes the trailing arm 18b and the air spring support 30b. The second end 21b of the trailing arm 18b is rearwardly, downwardly sloped and is defined by a rearward surface 80 and a ledge 82 that is vertically offset below an uppermost surface of the trailing arm 18*b*. The forward edge 60*b* of each of the support brackets 58*b* of the air spring support 30*b* has a forwardly-opening concave shape that is positioned about a complimentary convex shape of the rearward surface 80 of the trailing arm 18*b*. The forward edge portion 66*b* of the top plate 56*b* cantilevers and extends over the ledge 82 of the second end 21*b* of the trailing arm 18*b* and is secured thereto via a weld located within the welding window 68*b*. The air spring support 30*b* is further secured to the associated trailing arm 18*b* via welds 84, while the top plate 56*b* and the support brackets 58*b* are secured to one another via a plurality of welds 86. This particular configuration allows the overall height of the trailing arm assembly 12*b* to be minimized, and allows vertical loads from the air spring assemblies 28 to be supported by the trailing arm 18*b* through compressive stresses within the ledge 82 and rearward surface 80 of the trailing arm 18*b*.

The reference numeral 18*c* (FIGS. 15-17) generally designates another embodiment of the trailing arm of the present invention. Since the trailing arm 18*c* is similar to the previously described embodiment of the trailing arm 18, similar parts appearing in FIGS. 3-6 and FIGS. 15-17 respectively are represented by the same, corresponding reference numeral, except for the suffix "c" in the numerals of the latter. As best illustrated in FIGS. 16 and 17, the overall height h defined between an uppermost portion of the recess 46*c* and the substantially perpendicularly located upper surface of the trailing arm 18*c* is reduced. This reduction in overall height is accomplished by providing a relatively thick portion 40*c*' to the web portion 40*c* of the trailing arm 18*c* proximate the recess 46*c*, whereat the portion 40*c* of the web portion 40*c* has a relatively greater thickness t" compared to the thickness t' of the web portion 40*c* extending along the remaining length of the trailing beam 18*c*. Preferably, the thickness t" is between 2 and 8 times greater than the thickness t'. It is noted that the trailing arm 18*c* does not include vertically extending reinforcement webs proximate to the forward edge of the recess 46*c*, thereby providing a reduction in the overall weight of the trailing arm 18*c*.

Figure 18:
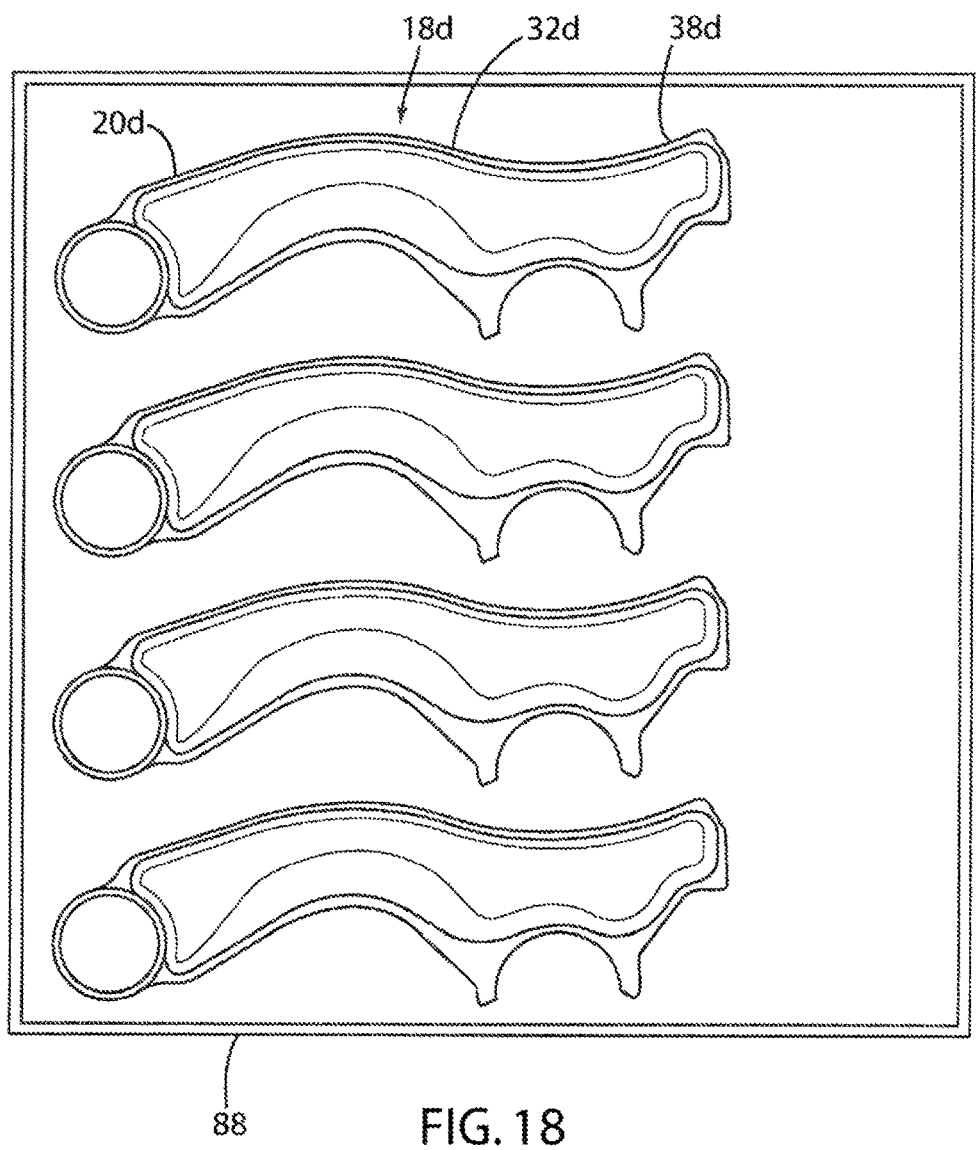

The reference numeral 18*d* (FIG. 18) generally designates yet another embodiment of the trailing arm of the present invention. Since the trailing arm 18*d* is similar to the previously described embodiment of the trailing arm 18, similar parts appearing in FIGS. 3-6 and FIG. 18 respectively are represented by the same, corresponding reference numeral, except for the suffix "d" in the numerals of the latter. The trailing arm 18*d* is provided with an overall curvalinear body shape thereby allowing "nesting" of a plurality of trailing arms 18*d* with one another within an associated casting core box 88. The nesting of the trailing arms 18*d* with one another reduces the overall area required within the casting core box 88, thereby increasing yield per mold during the casting process, resulting in a reduction in costs for manufacturing each beam and increasing the overall efficiency of the foundry.

The present inventive trailing arm assembly and related suspension system increases the durability of the associated axle connection, while simultaneously reducing the weight. The trailing arm assembly and suspension system is efficient in assembly and use, is capable of a long operating life, and is particularly well adapted for the proposed use.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is as follows:

1. A suspension assembly, comprising:
an axle member;
a first trailing beam assembly including a first trailing beam having a first end operably coupled to a vehicle frame and having a second end that includes an outwardly opening first recess, the first recess including an outer periphery, wherein the axle member is positioned within the first recess, and wherein an uninterrupted first weld extends between the axle member and the first trailing beam and from a position substantially proximate a leading edge of the first recess to a position substantially proximate a trailing edge of the first recess, thereby securing the first trailing beam to the axle member; and
a second trailing beam assembly including a second trailing beam having a first end operably coupled to the vehicle frame and having a second end that includes an outwardly opening second recess, the second recess including an outer periphery, wherein the axle member is positioned within the second recess, and wherein an uninterrupted second weld extends between the axle member and the second trailing beam and from a position substantially proximate a leading edge of the second recess to a position substantially proximate a trailing edge of the second recess, thereby securing the second trailing beam to the axle member; and
wherein a portion of the first weld located proximate the leading edge of the first recess and a portion of the second weld located proximate the leading edge of the second recess are each located between about 30° and about 45° below horizontal.

2. The suspension assembly of claim 1, wherein the first recess and the second recess are each downwardly opening.

3. The suspension assembly of claim 1, wherein the first weld extends about a majority of the periphery of the first recess, and wherein the second weld extends about a majority of the periphery of the second recess.

4. The suspension assembly of claim 3, wherein the first weld is uninterrupted about the periphery of the first recess, and the second weld is uninterrupted about the periphery of the second recess.

5. The suspension assembly of claim 1, wherein the portion of the first weld located proximate the leading edge of the first recess and the portion of the second weld located proximate the leading edge of the second recess are each located about 35° below horizontal.

6. A suspension assembly, comprising:
an axle member;
a first trailing beam assembly including a first trailing beam having a first end operably coupled to a vehicle frame and having a second end that includes an outwardly opening first recess, the first recess including an outer periphery, wherein the axle member is positioned within the first recess, and wherein an uninterrupted first weld extends between the axle member and the first trailing beam and from a position substantially proximate a leading edge of the first recess to a position substantially proximate a trailing edge of the first recess, thereby securing the first trailing beam to the axle member; and
a second trailing beam assembly including a second trailing beam having a first end operably coupled to the vehicle frame and having a second end that includes an outwardly opening second recess, the second recess including an outer periphery, wherein the axle member is positioned within the second recess, and wherein an uninterrupted second weld extends between the axle member and the second trailing beam and from a position substantially proximate a leading edge of the second recess to a position substantially proximate a trailing edge of the second recess, thereby securing the second trailing beam to the axle member; and wherein a portion of the first weld located proximate the trailing edge of the first recess and a portion of the second weld located proximate the trailing edge of the second recess are each located between about 25° and about 45° above horizontal.

7. The suspension assembly of claim 6, wherein the portion of the first weld located proximate the trailing edge of the first recess and the portion of the second weld located proximate the trailing edge of the second recess are each located about 8° above horizontal.

8. A suspension assembly, comprising:
an axle member;
a first trailing beam assembly include a first trailing beam having a first end operably coupled to a vehicle frame and having a second end that includes an outwardly opening first recess, the first recess including an outer periphery, wherein the axle member is positioned within the first recess, and wherein a first weld extends between the axle member and the first trailing beam and about the entire periphery of the first recess, thereby securing the first trailing beam to the axle member; and
a second trailing beam assembly including a second trailing beam having a first end operably coupled to the vehicle frame and having a second end that includes an outwardly opening second recess, the second recess including an outer periphery wherein the axle member is positioned within the second recess, and wherein a second weld extends between the axle member and the second trailing beam and about the entire periphery of the second recess, thereby securing the second trailing beam to the axle member; and
wherein a portion of the first weld located proximate the leading edge of the first recess and a portion of the second weld located proximate the leading edge of the second recess are each located between about 30° and about 45° below horizontal.

9. The suspension assembly of claim 8, wherein the first recess and the second recess are each downwardly opening.

10. The suspension assembly of claim 8, wherein the first weld is uninterrupted about the periphery of the first recess and the second weld is uninterrupted about the periphery of the second recess.

11. The suspension assembly of claim 8, wherein the portion of the first weld located proximate the leading edge of the first recess and the portion of the second weld located proximate the leading edge of the second recess are each located about 35° below horizontal.

12. A suspension assembly, comprising:
an axle member;
a first trailing beam assembly include a first trailing beam having a first end operably coupled to a vehicle frame and having a second end that includes an outwardly opening first recess, the first recess including an outer periphery, wherein the axle member is positioned within the first recess, and wherein a first weld extends between the axle member and the first trailing beam and about the entire periphery of the first recess, thereby securing the first trailing beam to the axle member; and
a second trailing beam assembly including a second trailing beam having a first end operably coupled to the vehicle frame and having a second end that includes an outwardly opening second recess, the second recess including an outer periphery wherein the axle member is positioned within the second recess, and wherein a second weld extends between the axle member and the second trailing beam and about the entire periphery of the second recess, thereby securing the second trailing beam to the axle member; and
wherein a portion of the first weld located proximate the trailing edge of the first recess and a portion of the second weld located proximate the trailing edge of the second recess are each located between about 25° and about 45° above horizontal.

13. The suspension assembly of claim 12, wherein the portion of the first weld located proximate the trailing edge of the first recess and the portion of the second weld located proximate the trailing edge of the second recess are each located about 8° above horizontal.

14. A suspension assembly, comprising:
an axle member;
a first trailing beam assembly including a first trailing beam having a first end operably coupled to a vehicle frame and having a second end that includes an outwardly opening first recess, the first recess including an outer periphery, a leading edge and a trailing edge, wherein the axle member is positioned within the first recess and a first weld extends between the axle member and the first trailing beam and at least partially about the outer periphery of the first recess, wherein the first weld comprises an uninterrupted weld that extends about a majority of the entire periphery of the first recess; and
a second trailing beam assembly including a second trailing beam having a first end operably coupled to the vehicle frame and having a second end that includes an outwardly opening second recess, the second recess including an outer periphery, a leading edge and a trailing edge, wherein the axle member is positioned within the second recess and a second weld extends between the axle member and the second trailing beam and at least partially about the outer periphery of the second recess, wherein the second weld comprises an uninterrupted weld that extends about a majority of the entire periphery of the second recess; and
wherein a portion of the first weld located proximate the leading edge of the first recess and a portion of the second weld located proximate the leading edge of the second recess are each located between about 30° and about 45° below horizontal.

15. The suspension assembly of claim 14, wherein the first recess and the second recess are each downwardly opening.

16. The suspension assembly of claim 14, wherein the portion of the first weld located proximate the leading edge of the first recess and the portion of the second weld located proximate the leading edge of the second recess are each located about 35° below horizontal.

17. A suspension assembly, comprising:
an axle member;
a first trailing beam assembly including a first trailing beam having a first end operably coupled to a vehicle frame and having a second end that includes an outwardly opening first recess, the first recess including an outer periphery, a leading edge and a trailing edge, wherein the axle member is positioned within the first recess and a first weld extends between the axle member and the first trailing beam and at least partially about the outer periphery of the first recess, wherein the first weld comprises an uninterrupted weld that extends about a majority of the entire periphery of the first recess; and a second trailing beam assembly including a second trailing beam having a first end operably coupled to the vehicle frame and having a second end that includes an outwardly opening second recess, the second recess including an outer periphery, a leading edge and a trailing edge, wherein the axle member is positioned within the second recess and a second weld extends between the axle member and the second trailing beam and at least partially about the outer periphery of the second recess, wherein the second weld comprises an uninterrupted weld that extends about a majority of the entire periphery of the second recess; and wherein a portion of the first weld located proximate the trailing edge of the first recess and a portion of the second weld located proximate the trailing edge of the second recess are each located between about 25° and about 45° above horizontal.

18. The suspension assembly of claim 17, wherein the portion of the first weld located proximate the trailing edge of the first recess and the portion of the second weld located proximate the trailing edge of the second recess are each located about 8° above horizontal.

* * * * *

UNITED STATES PATENT AND TRADEMARK OFFICE
CERTIFICATE OF CORRECTION

PATENT NO. : 10,029,527 B2
APPLICATION NO. : 15/083981
DATED : July 24, 2018
INVENTOR(S) : Gregory Galazin et al.

Page 1 of 1

It is certified that error appears in the above-identified patent and that said Letters Patent is hereby corrected as shown below:

In the Specification

Column 1, Line 65:
"extend" should be — extends —

Column 5, Line 49:
"curvalinear" should be — curvilinear —

In the Claims

Column 6, Claim 1, Line 19:
Delete "and"

Column 7, Claim 8, Line 32:
Delete "and"

Column 8, Claim 12, Line 3:
Delete "and"

Column 8, Claim 14, Line 37:
Delete "and"

Column 9, Claim 17, Line 8:
Delete "and"

Signed and Sealed this
Eleventh Day of February, 2020

Andrei Iancu
*Director of the United States Patent and Trademark Office*